(12) United States Patent
Yokohari

(10) Patent No.: US 12,163,849 B2
(45) Date of Patent: Dec. 10, 2024

(54) BOARD ANALYSIS SUPPORTING METHOD AND BOARD ANALYSIS SUPPORTING SYSTEM

(71) Applicant: HITACHI, LTD., Tokyo (JP)

(72) Inventor: Takashi Yokohari, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 337 days.

(21) Appl. No.: 17/638,767

(22) PCT Filed: Mar. 24, 2020

(86) PCT No.: PCT/JP2020/012952
§ 371 (c)(1),
(2) Date: Feb. 25, 2022

(87) PCT Pub. No.: WO2021/192021
PCT Pub. Date: Sep. 30, 2021

(65) Prior Publication Data
US 2022/0276104 A1 Sep. 1, 2022

(51) Int. Cl.
*G01L 1/14* (2006.01)

(52) U.S. Cl.
CPC .................... *G01L 1/142* (2013.01)

(58) Field of Classification Search
None
See application file for complete search history.

(56) References Cited

U.S. PATENT DOCUMENTS

2010/0070204 A1* 3/2010 Monda ................ H05K 3/3436
702/35
2010/0250149 A1* 9/2010 Omori ................ G01R 31/2849
702/41

FOREIGN PATENT DOCUMENTS

| JP | 2005-026250 A | | 1/2005 | |
|---|---|---|---|---|
| JP | 2005115859 A | * | 4/2005 | |
| JP | 2010-218270 A | | 9/2010 | |
| JP | 2011-159870 A | | 8/2011 | |
| JP | 2013191888 A | * | 9/2013 | ........... H05K 3/3436 |
| JP | 2015133051 A | * | 7/2015 | |
| WO | WO-2009/044699 A1 | | 4/2009 | |

OTHER PUBLICATIONS

Office Action issued in corresponding Japanese Patent Application No. 2022-509821, with English Machine Translation dated Feb. 28, 2023 (5 pages).
International Search Report with English translation and Written Opinion issued in corresponding application No. PCT/JP2020/012952 dated Jul. 21, 2020.

* cited by examiner

*Primary Examiner* — Natalie Huls
*Assistant Examiner* — Nyla Gavia
(74) *Attorney, Agent, or Firm* — Foley & Lardner LLP

(57) ABSTRACT

A board analysis supporting method comprising the following to be executed by an information processing device: board analyzing processing of setting a surface on which a component is mounted on a predetermined board, and calculating strain generated in the board from which the component has been removed, based on three-dimensional structure data indicating the board from which the component has been removed, and data indicating a predetermined force; and strain calculating processing of calculating the calculated strain on the set surface as strain of the component mounted on the set surface.

6 Claims, 14 Drawing Sheets

CONVERSION FROM TETRAHEDRON MESH TO TRIANGULAR MESH

FIG. 8
STRAIN CALCULATING METHOD
(a) THREE-DIMENSIONAL DISPLAY
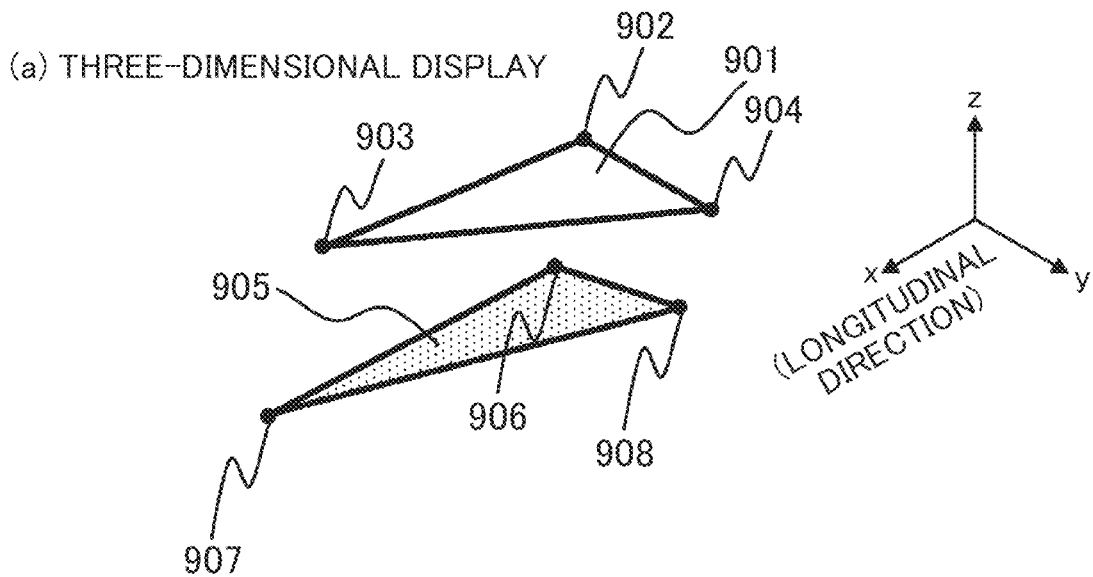
(b) TWO-DIMENSIONAL DISPLATY (x-z PLANE)
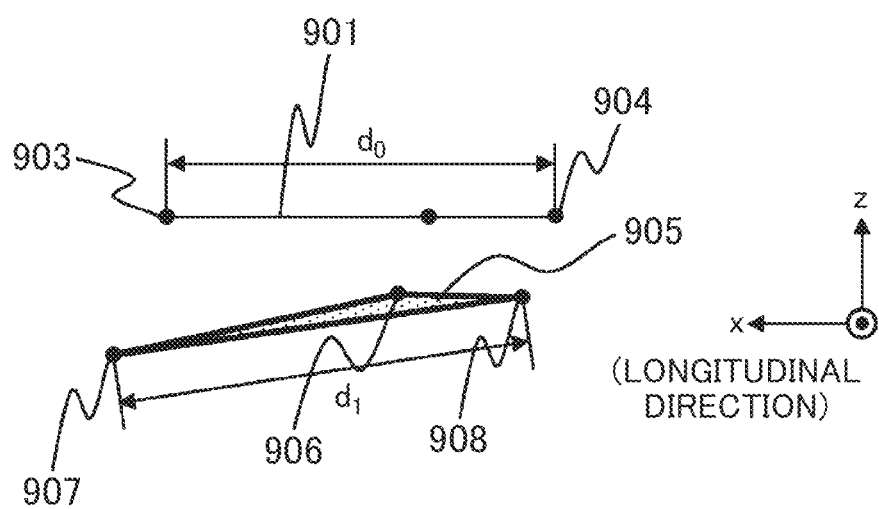
$d_2 = d_1 - d_0$
STRAIN $e = d_2 / d_0$

STRAIN THRESHOLD VALUE INPUT SCREEN

STRAIN REGION DISPLAY SCREEN

BOARD ANALYSIS SUPPORTING METHOD AND BOARD ANALYSIS SUPPORTING SYSTEM

TECHNICAL FIELD

The present invention relates to a board analysis supporting method and a board analysis supporting system.

BACKGROUND ART

With high density of electronic components, events in which cracks occur in electronic components on a mounting surface of a printed circuit board (PCB) are increasing. In particular, since the dielectric used in a multilayer ceramic capacitor is ceramic with high dielectric constant, and the ceramic is a brittle material, its tensile strength is extremely low compared to its compressive strength, and hence, the ceramic is easily damaged by careless handling of the printed circuit board.

In this regard, if electronic components with lead wires (hereinafter simply called components) are used, the deflection of the board due to mechanical or thermal stress is absorbed by the lead wire portions, so that a risk of damage to the components is reduced. However, since the heavy use of the components with the lead wires leads to an increase in product prices, it is common that in the recent printed circuit board, components with no lead wires are used to be mounted on a board surface.

Such a printed circuit board has been incorporated in most electrical products. In order to ensure the reliability of the electrical products, attempts have been made to evaluate the risk of breakage of components mounted on the surface of the printed circuit board.

There has been described in, for example, Patent Literature 1 that when the warpage of a printed circuit board at a location where a component is arranged exceeds a deformation allowable value set to the component, the component is highlighted. Design data of the printed circuit board includes various information about the shape and size of the board, the shape, size, and placement position of each component mounted on the board, etc. There has been disclosed in the same Patent Literature that by simulating the analysis of warpage of the board due to thermal expansion, the distribution of warpage of the board (displacement distribution on the board surface) is calculated and displayed on a display device in a state in which the design data and data of the distribution of warpage of the board are superimposed on each other, and each component mounted on a printed circuit board portion having a displacement value exceeding an allowable value is highlighted and displayed.

There has been described in Patent Literature 2 that evaluation reference values for strain and stress are set, and two-dimensional board data and component arrangement data are displayed as the level of risk on the basis of the results of three-dimensional analysis of them. There has been described that an automatic design supporting system that creates a three-dimensional finite element model from design information of a printed circuit board and each mounting component, creates analysis data from the three-dimensional finite element model, and executes an analysis operation on the basis of the analysis data, determines using the result of the analysis operation whether a problem occurs in design, performs determination of the analysis result by comparing an evaluation reference value including a strain value or a stress value that causes damage to the printed circuit board or each component, with the result of the analysis operation, and displays the result of its determination with replaced with the level of risk of the occurrence of product defects or damage.

There has been described in Patent Literature 3 that the amount of warpage of a printed circuit board and stress thereof are calculated using the multilayered beam theory. It has been described that the shape data and arrangement data of a printed circuit board and each electronic component are read, a material characteristic value is added to each data to generate model data of the printed circuit board, the warping direction of the printed circuit board, the amount of warpage of the printed circuit board, and warping stress at a soldered point are calculated based on the model data, and thereby the design condition optimum in stress balance at the soldered point is calculated.

There has been described in Patent Literature 4 that the amounts of warpage of a component and a printed circuit board are calculated using an equation which incorporates the flexural rigidity of a board that can consider the influence of the Poisson's ratio into the multilayered beam theory. It has been described that model data which is a three-dimensional warp analysis program of a printed circuit board and is indicative of the shapes of the printed circuit board and each electric component is divided in shapes, and the warpage of a cut surface and an outer cross-section of each divided model is calculated using a theoretical formula.

CITATION LIST

Patent Literature

PTL 1: Japanese Patent Application Laid-Open No. 2015-133051
PTL 2: Japanese Patent Application Laid-Open No. 2005-115859
PTL 3: Japanese Patent Application Laid-Open No. 2011-159870
PTL 4: International Publication No. 2009/044699

SUMMARY OF INVENTION

Technical Problem

However, Patent Literatures 1, 3, and 4 respectively have a problem in that the amount of warpage (amount of displacement) or stress is determined as an evaluation parameter of the printed circuit board, but the values of parameters in these Literatures reflect not only the risk of cracks or the like, but also the sizes of the targeted printed circuit board and components themselves, so that when there are printed circuit boards and components of various shapes and sizes, it is difficult to evaluate the values thereof.

In particular, Patent Literature 1 is for evaluating deformation, based on a displacement difference in a predetermined axial direction of the printed circuit board. However, the deformation of the printed circuit board or each component on the board does not necessarily occur in a constant axial direction. Therefore, if the set axial direction does not correspond to the direction of elongation of the component mounting surface of the printed circuit board, appropriate evaluation of the deformation cannot be performed.

Also, Patent Literature 2 is also to consider deformation in a predetermined axial direction. However, as described, when the axial direction does not correspond to the direction of elongation of the component mounting surface of the printed circuit board, appropriate evaluation cannot be performed.

Further, Patent Literature 2 is for analyzing the behavior of the printed circuit board with the components mounted thereon in order to obtain the strain and stress of the printed circuit board and the component. However, in the method by this full model analysis, the analysis can be very time consuming when targeting the recent high-density board.

For example, when a capacitor component is mounted on the surface of the board, the end of this component is soldered to a copper foil pattern on the board, and the ventral portion of the component is set to be in a state in which it is made to float from the board surface. Thereafter it is necessary to create a model given a contact condition between the ventral portion of the component and the printed circuit board. However, it is difficult to set an analysis condition for the model. Further, since the thickness of the copper foil is about 20 μm even if it is thin, the scale of an analytical mesh becomes enormous. Therefore, analysis processing having considered such a contact condition requires a huge amount of resources on a computer, so that it may be difficult to perform the analysis.

Incidentally, in Patent Literature 2, there has been described a method of simplifying the three-dimensional finite element model by removing small components less affected by the analysis result to thereby shorten an analysis time. However, according to this method, it is not possible to analyze the small components. For example, when it is desired to evaluate the effect of a multilayer ceramic capacitor or the like important for mounting even if their sizes are fine, it is not possible to apply this method.

The present invention has been made in view of such a background, and it is an object of the present invention to provide a board analysis supporting method and a board analysis supporting system capable of quickly and accurately calculating strain generated in a component mounted on a board.

Solution to Problem

One of the present inventions for solving the above problem is to provide a board analysis supporting method of board analyzing processing of setting a surface on which a component is mounted on a predetermined board, and calculating strain generated in the board from which the component has been removed, based on three-dimensional structure data indicating the board from which the component has been removed, and data indicating a predetermined force, and strain calculating processing of calculating the calculated strain on the set surface as strain of the component mounted on the set surface.

Another one of the present inventions for solving the above problem is to provide a board analysis supporting system including a board analysis supporting device which has a processor and a memory and executes board analyzing processing of setting a surface on which a component is mounted on a predetermined board, and calculating strain generated in the board from which the component has been removed, based on three-dimensional structure data indicating the board from which the component has been removed, and data indicating a predetermined force, and strain calculating processing of calculating the calculated strain on the set surface as strain of the component mounted on the set surface.

Advantageous Effects of Invention

According to the present invention, it is possible to quickly and accurately strain generated in a component mounted on a board.

Problems, configurations, and effects other than those mentioned above will be apparent from the following description of embodiments.

BRIEF DESCRIPTION OF DRAWINGS

FIG. 8 is a view describing an example of a method for calculating strain.

DESCRIPTION OF EMBODIMENTS

Hereinafter, a board analysis supporting system according to the present embodiment will be described with reference to the drawings.

First Embodiment

Figure 1:
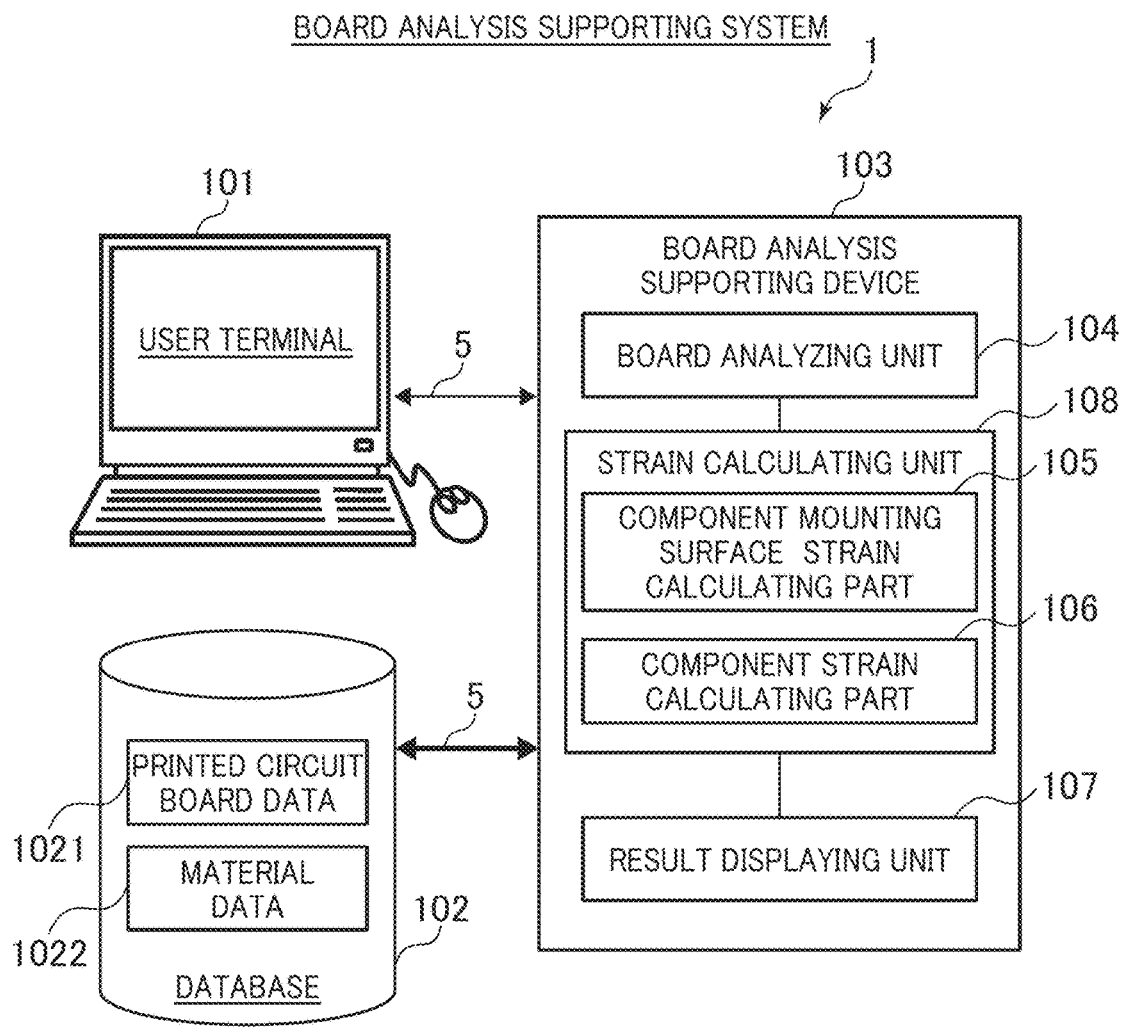
FIG. 1 is a view describing an example of a configuration of a board analysis supporting system according to a first embodiment.

<System Configuration>
FIG. 1 is a view describing an example of a configuration of a board analysis supporting system 1 according to a first embodiment. The board analysis supporting system 1 is constituted including a user terminal 101, a database 102, and a board analysis supporting device 103.

The user terminal 101, the database 102, and the board analysis supporting device 103 are connected communicably therebetween by, for example, a LAN (Local Area Network), a WAN (Wide Area Network), Internet, wire such as a dedicated line, or a wireless network 5.

The user terminal 101 is an information processing device used by a user, which analyzes a board (printed circuit board or the like) using the board analysis supporting device 103.

The board analysis supporting device 103 is an information processing device which executes a structure analysis program related to the board, based on an instruction given from the user terminal 101 and predicts a risk of damage to various components mounted on the board, specifically, strain (deformation), based on the result of execution of the structure analysis program.

The database 102 is an information processing device which stores three-dimensional structure data of the board, information about the result of execution of the structure analysis program, and information about a material used for the board. Specifically, for example, the database 102 stores one or a plurality of printed circuit board data 1021 being three-dimensional structure data of a printed circuit board, material data 1022 being data of characteristics (Poisson's ratio, Young's modulus or the like) that the material for the printed circuit board has, etc.

It is noted that in the present embodiment, the three-dimensional structure data is three-dimensional CAD (Computer Aided Design) data.

In the present embodiment, it is also noted that in a three-dimensional CAD model representing a structure comprised of a plurality of structural parts, the model of each structural part is referred to as a part model, and the model of the structure is referred to as an assembly model.

Also, in the present embodiment, it is noted that the three-dimensional CAD data includes unique identifiers representing a line (line part), a surface (surface part), and a solid body (solid part) in each structural part (part model). However, instead of such identifiers, the three-dimensional CAD data may use other types of information capable of identifying each part model.

Next, the board analysis supporting device 103 will be described in more detail.

<Board Analysis Supporting Device>

As shown in FIG. 1, the board analysis supporting device 103 includes respective functional units of a board analyzing unit 104, a strain calculating unit 108, and a result displaying unit 107.

The board analyzing unit 104 sets the surface (mounting surface) on which components are mounted on a printed circuit board, and calculates, based on three-dimensional structure data indicating a blank board from which the components have been removed, and data (hereinafter referred to as an analysis condition) indicating a predetermined force (such a force as to cause strain. This is hereinafter referred to also as a deformation force), strain generated on the blank board.

Specifically, the board analyzing unit 104 executes a simulation (structure analysis program) set with such various analysis conditions as to generate strain on the blank board on CAD data (data of tetrahedron mesh) representing a three-dimensional structure of a blank board having suppressed the various electronic components from the printed circuit boards with the various electronic components mounted on the set mounting surface to thereby perform strain analysis of the blank board.

Incidentally, the structure analysis program performs prescribed structure analysis (CAE: Computer Aided Engineering) using a Finite Element Method (FEM) or the like.

Next, the strain calculating unit 108 calculates the strain on the set mounting surface, which is calculated by the board analyzing unit 104 as strain of the component mounted on the mounting surface set by the board analyzing unit 104.

That is, the strain calculating unit 108 includes a component mounting surface strain calculating part 105 which calculates strain on the mounting surface, and a component strain calculating part 106 which calculates strain of each component on the mounting surface.

For example, the strain calculating unit 108 calculates as the strain of the component, the difference between the distance (distance between nodes) between predetermined substance points on the set mounting surface before application of the deformation force, and the distance between nodes on the set mounting surface after application of the deformation force.

When it is determined that the strain of the component calculated by the strain calculating unit 108 exceeds a predetermined threshold value, the result displaying unit 107 specifies a component mounted on a position corresponding to a substance point on the set mounting surface and outputs warning information about the specified component.

Specifically, for example, when the result displaying unit 107 sets a predetermined direction (hereinafter called a strain check direction) on the mounting surface on which each component is mounted, and determines that a strain check direction constituent in the strain of the component calculated by the strain calculating unit 108 exceeds a predetermined threshold value, the result displaying unit 107 outputs warning information about the component.

In more detail, when the result displaying unit 107 sets a longitudinal direction on the mounting surface on which each component is mounted, and determines that a longitudinal direction constituent in the stain of the component calculated by the strain calculating unit 108 exceeds a predetermined threshold value, the result displaying unit 107 outputs warning information about the component.

Figure 2:
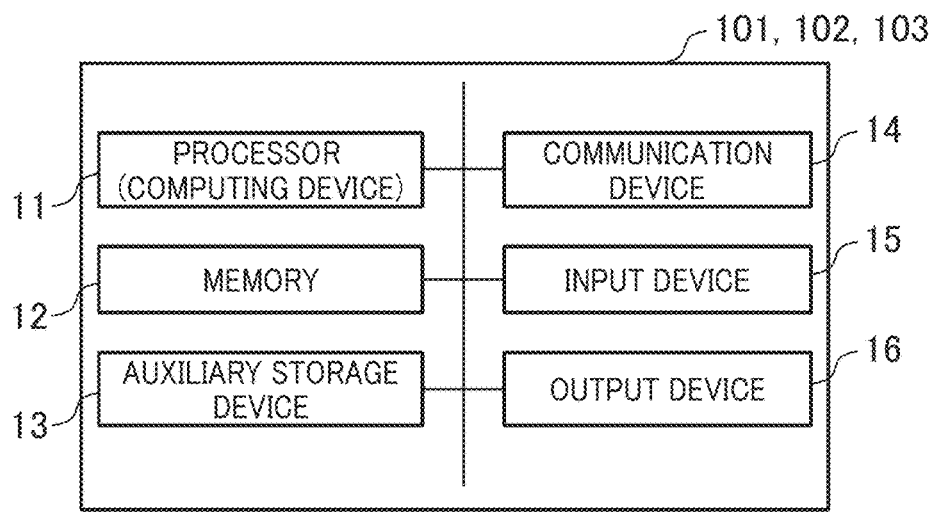
FIG. 2 is a view describing an example of hardware included in a board analysis supporting device and a user terminal.

Here, FIG. 2 is a view describing an example of hardware included in each of the information processing devices of the user terminal 101, the database 102, and the board analysis supporting device 103. These information processing devices respectively include a processor 11 (computing device) such as a CPU, a memory 12 such as a RAM (Random Access Memory) or a ROM (Read Only Memory) in which software and data or the like are expanded, an auxiliary storage device 13 such as an HDD (Hard Disk Drive), an SSD (Solid State Drive) or a flash memory, a communication device 14 such as a network interface card, for communicating with other information processing devices, an input device 15 such as a keyboard or a touch panel, and an output device 16 such as a monitor or a display. These are connected to each other by a bus or the like.

The function of each information processing device is realized by dedicated hardware or by reading and executing each program stored in the memory 12 or the auxiliary storage device 13 by the processor 11. Further, each program may be recorded in advance in a recording medium readable by each information processing device, or may be introduced when necessary via a recording medium or a predetermined communication network.

<Processing>

Next, description will be made as to processing executed in the board analysis supporting system 1. The board analysis supporting device 103 executes board analysis supporting processing of predicting a risk of damage to various components mounted on the board (estimation of strain).

<Board Analysis Supporting Processing>

Figure 3:
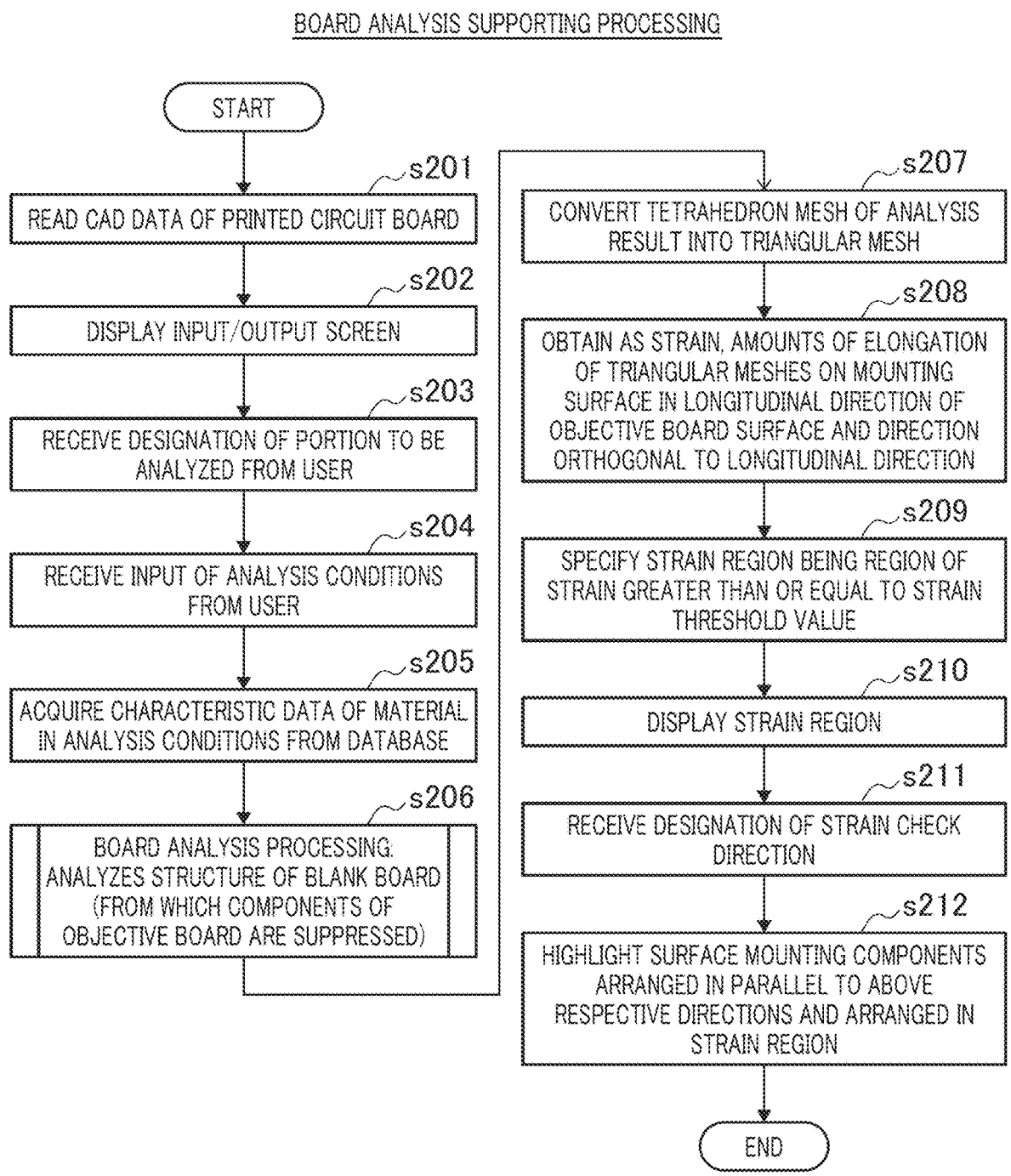
FIG. 3 is a flowchart describing an example of board analysis supporting processing.

FIG. 3 is a flowchart describing an example of the board analysis supporting processing. Incidentally, this processing is started when the board analysis supporting device 103 receives a predetermined analysis request from the user terminal 101, for example.

First, the board analyzing unit 104 of the board analysis supporting device 103 receives three-dimensional structure data of a printed circuit board from the printed circuit board data 1021 of the database 102 (s201).

The board analyzing unit 104 displays a predetermined input/output screen for receiving from the user, the input of information about a printed circuit board (hereinafter referred to as an objective board) to be analyzed, and an analysis condition (s202).

Based on the input/output screen, the board analyzing unit 104 first receives from the user, the input of information related to the objective board and a portion (hereinafter referred to as an analysis objective portion) to be analyzed on the objective board (s203).

Specifically, for example, the board analyzing unit 104 receives the designation of an objective board, a surface (mounting surface to evaluate strain) of the objective board with components mounted thereon, and a non-mounting surface (back surface) on the objective board.

(Analysis Objective Portion Setting Screen)

Figure 4:
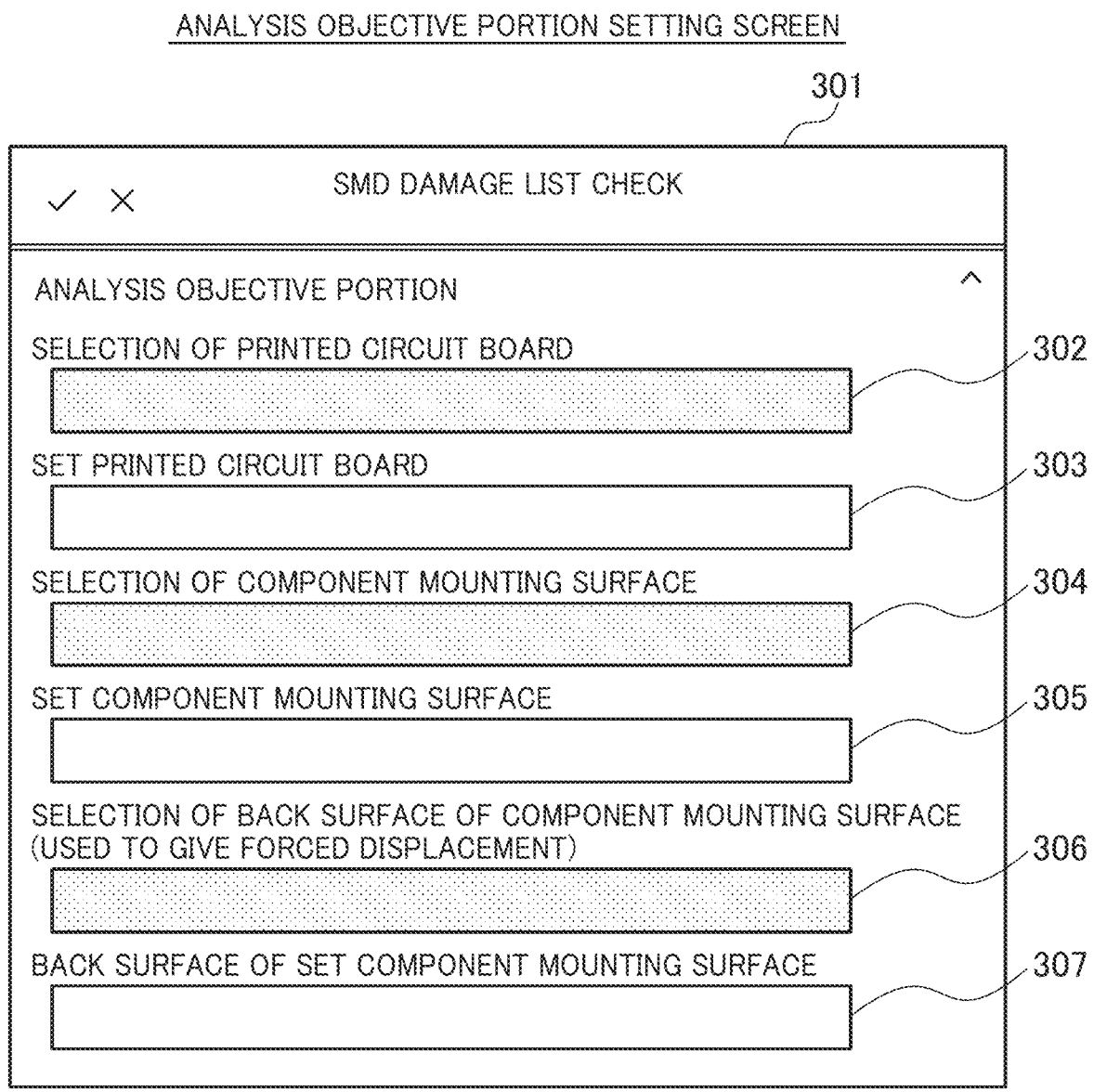
FIG. 4 is a view showing an example of an analysis objective portion setting screen for designating a portion to be analyzed.

Here, FIG. 4 is a view showing an example of an analysis objective portion setting screen 301 for designating an analysis objective portion. The analysis objective portion setting screen 301 includes a printed circuit board selection column 302 which receives the selection of each solid body of a part model of a printed circuit board by the input of an identifier, a printed circuit board confirmation column 303 where among the solid bodies according to the printed circuit board selection column 302, the solid body whose selection has been confirmed is displayed by the identifier, a mounting surface selection column 304 which receives the selection of each mounting surface of the printed circuit board, a set mounting surface confirmation column 305 where among the mounting surfaces according to the mounting surface selection column 304, information of the mounting surface whose selection has been confirmed is displayed, a back surface selection column 306 which receives the selection of each back surface of the printed circuit board, and a set back surface confirmation column 307 where among the back surfaces according to the back surface selection column 306, information of the back surface whose selection has been confirmed is displayed.

Incidentally, the back surface is set to give a forced displacement to be described later. Further, the board analyzing unit 104 may automatically recognize the back surface on the basis of the designated mounting surface.

Further, here, the analysis objective portion setting screen 301 receives the selection of the part model by the input of the identifier, but may accept the input of other information (e.g., a component name) other than the identifier.

Next, as shown in FIG. 3, the board analyzing unit 104 receives from the user, the setting of parameters (analysis conditions) for the force that causes strain on the objective board, which are set to the objective board (s204).

The analysis conditions are, for example, deformation forces that cause strain, such as fixing (for example, dynamic action that occurs when fastening components such as screws to the objective board) of each component onto each surface of the objective board, a load (for example, a compressive force on components such as a connector or the like when mounting the components on the objective board) on each surface of the objective board, and the forced displacement (for example, a force to deform another predetermined position of the central part or the like of the objective board in a state in which a predetermined position of the corner or the like of the objective board is fixed, and a force to generate deflection compliant with a predetermined bending test of the printed circuit board) with respect to the objective board.

Further, the analysis conditions include, for example, information (e.g., a resin name) about a material for the objective board.

(Analysis Condition Setting Screen)

Figure 5:
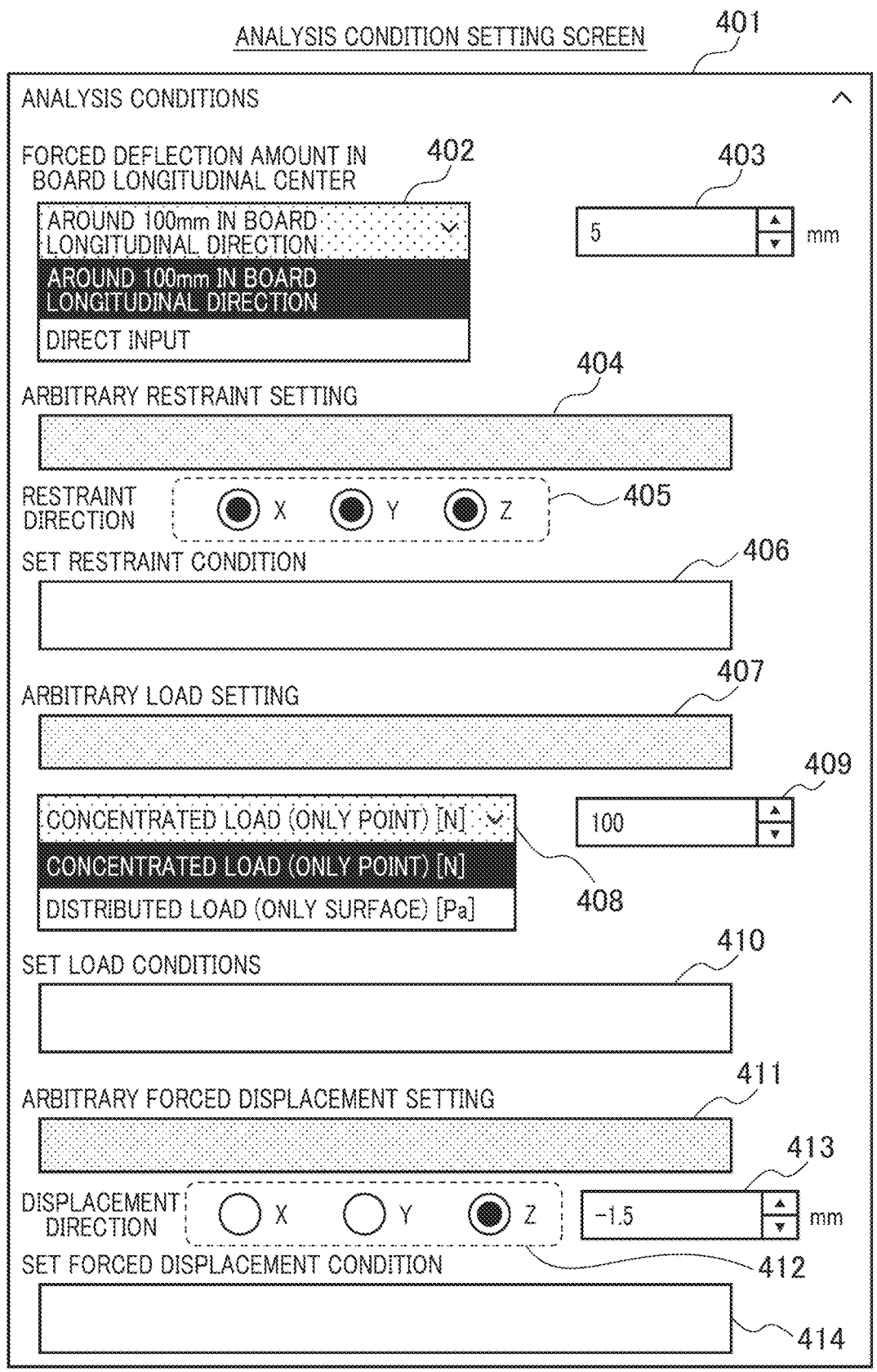
FIG. 5 is a view showing an example of an analysis condition setting screen for designating an analysis condition.

Here, FIG. 5 is a view showing an example of an analysis condition setting screen 401 for designating analysis conditions. The analysis condition setting screen 401 includes respective columns of a forced deflection amount selection column 402 in which the direction of a forced displacement is set, a forced deflection amount setting column 403 in which the magnitude of the forced displacement in the above direction is designated, an arbitrary restraint setting column 404 in which among the analysis conditions, the content of fixing of each component is set, an arbitrary restraint direction designating column 405 in which the direction of fixing of each component is set, a set restraint column 406 in which the fixing whose setting has been confirmed is displayed, an arbitrary load setting column 407 in which the content of the load is set, a concentrated load setting column 408 in which the type of load (a concentrated load that concentrates on one point and loads the objective board, or a distributed load that loads the entire objective board), an arbitrary load designating column 409 in which the magnitude of the load is set, a set load condition column 410 in which the content of the load whose setting has been confirmed is displayed, an arbitrary forced displacement setting column 411 in which the content of a forced displacement other than the forced displacement according to the forced deflection amount selecting column 402 is set, an arbitrary forced displacement direction designating column 412 in which the direction of the forced displacement in the above column 411 is set, an arbitrary restraint direction displacement designating column 413 in which the magnitude of the forced displacement in the above column 411 is set, and a set forced displacement condition column 414 in which the content of the forced displacement whose setting has been confirmed.

The forced deflection amount selecting column 402 is a column for simply setting the forced displacement in the analysis conditions, in which the forced displacement is set onto the line in the direction orthogonal to the longitudinal direction of the objective board at the center in the longitudinal direction on the back surface of the objective board.

On the other hand, the arbitrary forced displacement setting column 411 is a column for setting a forced displacement other than the forced displacement settable in the forced deflection amount selecting column 402.

(Material Setting Screen)

Figure 6:
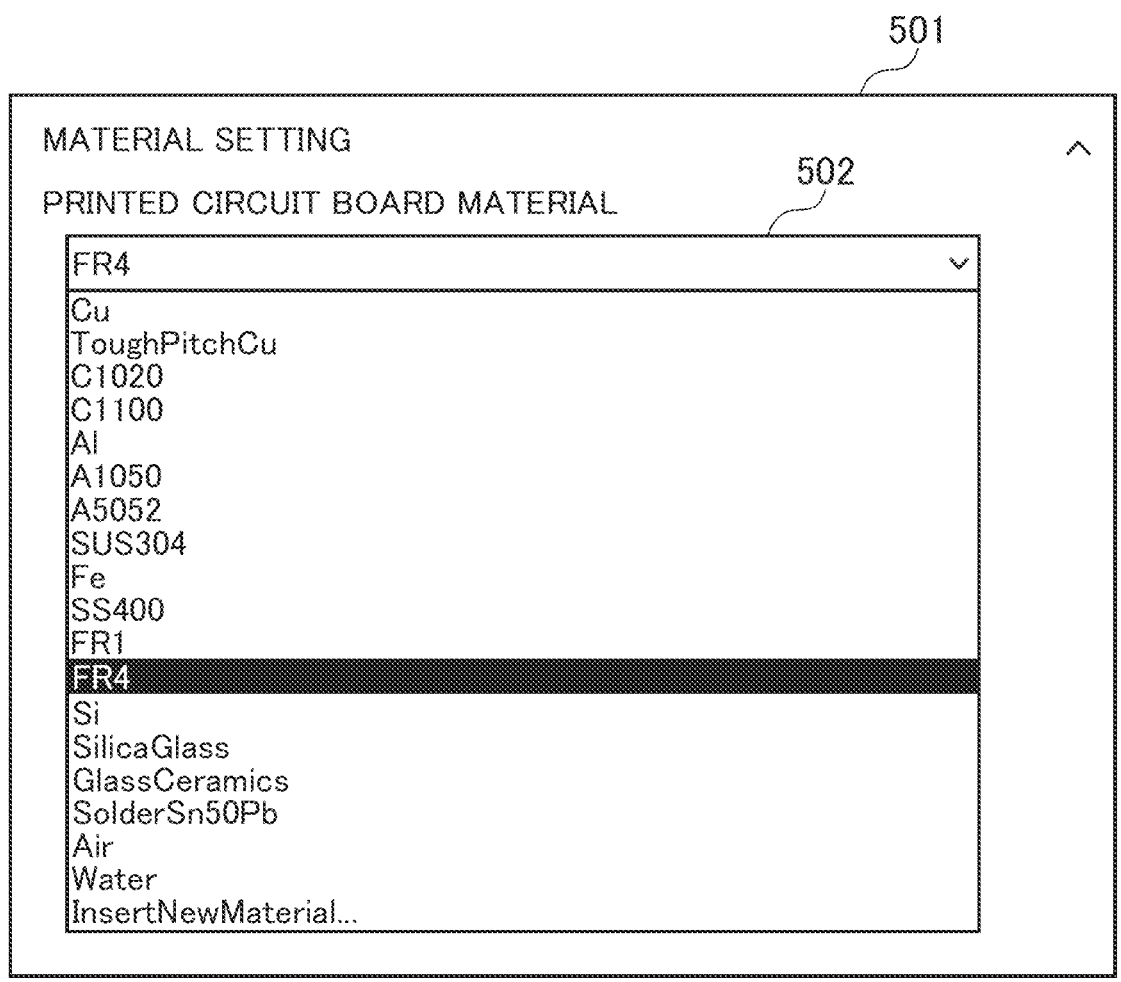
FIG. 6 is a view showing an example of a material setting screen for designating a material in the analysis condition.

Subsequently, FIG. 6 is a view showing an example of a material setting screen 501 for designating a material under the analysis conditions. The material setting screen 501 includes a material designating column 502 for designating the material. In the example of the same drawing, the default of the material is "FR4" (glass epoxy material).

Next, as shown in FIG. 3, the board analyzing unit 104 acquires data (hereinafter called characteristic data. For example, Young's modulus or Poisson's ratio or the like necessary for static analysis) corresponding to the material set in s204 from the material data 1022 of the database 102 (s205).

Then, the board analyzing unit 104 creates tetrahedron mesh data of the objective board corresponding to the structure analysis program. Thereafter, based on the structure analysis program, the board analyzing unit 104 executes board analysis processing of executing structure analysis of the objective board (blank board) when setting the condition indicated by the analysis conditions (specifically, from which the components have been forcibly removed (suppressed)) (s206). The detail of the structure analysis processing will be described later.

After that, the strain calculating unit 108 converts the tetrahedron mesh data of the objective board after the board analysis processing into predetermined triangular mesh data (s207). Further, the strain calculating unit 108 converts the tetrahedron mesh data of the objective board after the board analysis processing into triangular mesh data, based on the result data (hereinafter referred to as data for post-processing) of the structure analysis output in s206 (s207).

Incidentally, the post-processing data includes, for example, data (data of tetrahedron mesh) indicative of the post-deformed structure of the blank board deformed based on the analysis conditions.

(Conversion from Tetrahedron Mesh Data to Triangular Mesh Data)

Figure 7:
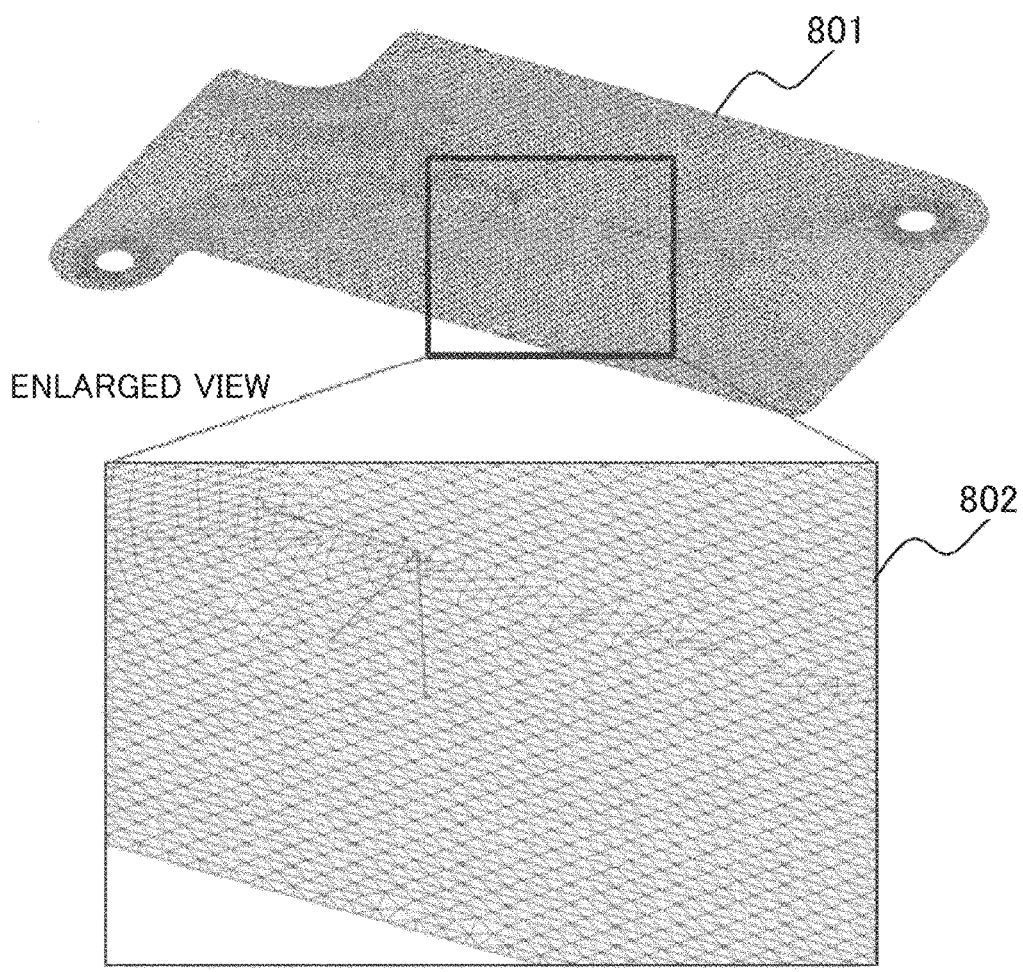
FIG. 7 is a view showing an example of a method for converting tetrahedron mesh data into triangular mesh data.

FIG. 7 is a view showing an example of a method for converting the tetrahedron mesh data into the triangular mesh data.

In order to calculate the strain of a mounting surface, the strain calculating unit 108 generates a triangular mesh 802 of the mounting surface from a tetrahedron mesh 801 of an objective board. In this case, in order to utilize each node in the tetrahedron mesh 801 as it is, the strain calculating unit 108 uses the node of the post-conversion triangular mesh 802 as a node at the same location as the tetrahedron mesh 801 (for example, it is made to be the same node number).

In the present embodiment, it is noted that the tetrahedron mesh 801 of the objective board is taken to be a mesh of tetrahedron comprised of sides in the three directions of the longitudinal direction of the board surface of the objective board, the transverse direction of the board surface of the objective board, and the direction orthogonal to the board surface of the objective board.

Next, as shown in FIG. 3, the strain calculating unit 108 calculates strain on the mounting surface, based on the triangular mesh data converted in s207 (s208).

Specifically, for example, the strain calculating unit 108 calculates based on the respective triangular mesh data converted in s207, the amounts of elongation of the respective triangular meshes on the mounting surface of the objective board in the longitudinal direction and the transverse direction (hereinafter these two directions will be referred to as calculation directions) on the mounting surface of the objective board, respectively, and takes each of the elongations of the calculated triangular meshes to be strain of each triangular mesh.

(Method for Calculating Strain)

FIG. 8 is a view describing an example of a strain calculating method. It is noted hereinafter that the mounting surface of the objective board is taken as an x-y plane, the longitudinal direction of the mounting surface of the objective board is taken as an x direction, the transverse direction of the mounting surface is taken as a y direction, and the direction orthogonal to the mounting surface is taken as a z direction.

As shown in the three-dimensional display in the same drawing, a triangular mesh 901 having as nodes, a first point 902, a second point 903, and a third point 904 on the mounting surface (x-y plane) respectively becomes a post-deformation triangular mesh 905 having as nodes, a fourth point 906 corresponding to the first point 902, a fifth point 907 corresponding to the second point 903, and a sixth point 908 corresponding to the third point 904 depending on the deformation due to the analysis conditions. In this case, a line segment connecting the second point 903 and the third point 904 is a line segment in the longitudinal direction of the objective board, and this line segment extends due to the deformation.

Here, as shown in the two-dimensional display (view in which the pre-deformation triangular mesh 901 and the triangular mesh 905 after its deformation are projected onto an x-z plane with the y direction as the normal), a distance d0 of an x-z plane component of the line segment between the second point 903 and the third point 904, prior to the deformation by the analysis conditions changes into a distance d1 of an x-z plane component of the line segment between the fifth point 907 corresponding to the second point 903 and the sixth point 908 corresponding to the third point 904 due to the deformation. Accordingly, the strain calculating unit 108 calculates the amount of elongation d2 of a longitudinal direction component of the mounting surface in the triangular mesh as d2=d1−d0. Thus, the feature of the present embodiment is that the elongation amount d2 is not the length of the x component itself in the longitudinal direction of the objective board.

Based on the above, the strain calculating unit 108 calculates strain e in the longitudinal direction of the objective board in the triangular mesh as e=d2/d0.

The strain calculating unit 108 performs the calculation of the strain e in the longitudinal direction on all the triangular meshes. Further, the strain calculating unit 108 also performs the calculation of strain e in the direction orthogonal to the longitudinal direction on all the triangular meshes.

Incidentally, there is shown herein the example of calculating the strain in the longitudinal direction of the mounting surface by noting that a multilayer ceramic capacitor is generally vulnerable to the longitudinal elongate of the objective board, but strain based on other directions may be measured. For example, since the multilayer ceramic capacitor is assumed to be vulnerable even to a force in the shearing direction generated when a printed circuit board is twisted, the strain calculating unit 108 may perform the above calculation of strain with the deformation direction as the shearing direction.

Next, as shown in FIG. 3, the strain calculating unit 108 accepts the input of a threshold value (strain threshold value) indicative of the limit of strain of the component from the user by displaying the input screen (strain threshold value setting screen) related to the threshold value of strain, and specifies the region of the mounting surface, having strain exceeding the input strain threshold value on the basis of the strain calculated in s208 (s209).

Specifically, for example, the strain calculating unit 108 specifies a triangular mesh which is a triangular mesh of the mounting surface among the respective triangular meshes calculated in s207 and whose strain e is greater than or equal to the strain threshold value.

(Strain Threshold Value Input Screen)

Figure 9:
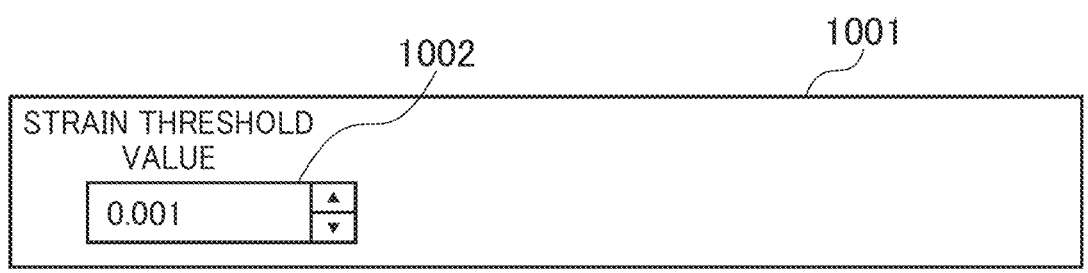
FIG. 9 is an example of a strain threshold value setting screen.

FIG. 9 is an example of a strain threshold value setting screen 1001. The strain threshold value setting screen 1001 has a threshold value setting column 1002 which receives the input of a strain threshold value. A strain (1000 microstrain) of 0.1% that can damage the multilayer ceramic capacitor is set to the threshold value setting column 1002 as a default value.

Subsequently, as shown in FIG. 3, the result displaying unit 107 displays a strain region display screen being a screen displaying the region of the strain specified in s208 (s210).

(Strain Region Display Screen)

Figure 10:
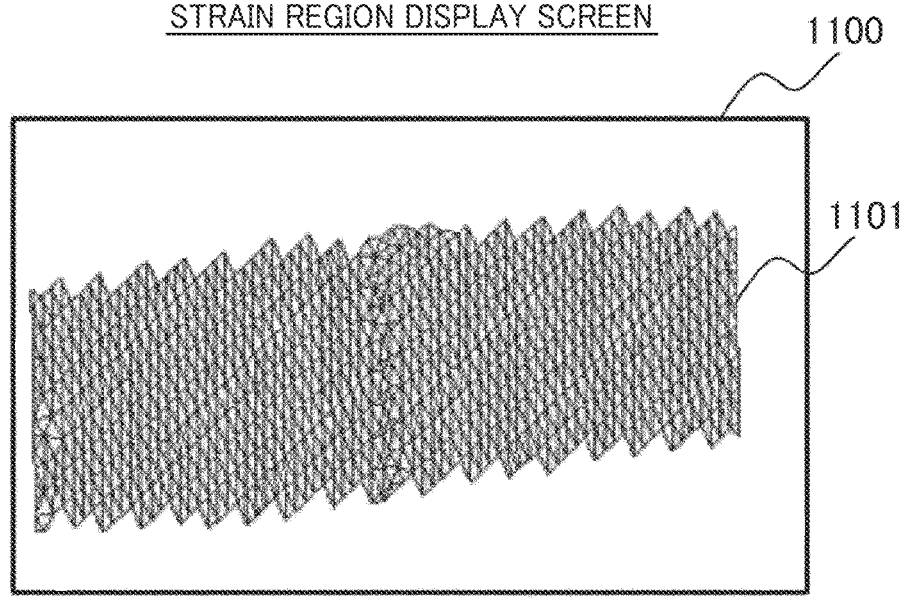
FIG. 10 is a view showing an example of a strain region display screen.

FIG. 10 is a view showing an example of the strain region display screen. For example, the region of strain is displayed on the strain region display screen 1100 by a method such as a line contour. Specifically, for example, all the triangular meshes 1101 having strain greater than or equal to the strain threshold value are displayed on the strain region display screen 1100.

Incidentally, when drawing the strain region display screen 1100, the result displaying unit 107 extracts a contour line (the edge of a triangular mesh which belongs only to one other triangular mesh) from a set of the triangular meshes specified in s208 and makes the extracted contour line to be a boundary line for the strain region.

Further, when drawing the triangular mesh and the contour line, the result displaying unit 107 preferably performs drawing processing, based on the coordinate values of the pre-deformation triangular mesh instead of the post-deformation triangular mesh.

Here, in order to clearly show the strain region to the user, the result displaying unit 107 may translucently display the triangular mesh 1101 being a surface part. Further, when drawing the strain region display screen 1100, the result displaying unit 107 may convert the region of the strain by the triangular mesh 1101 into an image of a line part of its corresponding three-dimensional CAD data and display the converted image together with the triangular mesh 1101.

Subsequently, as shown in FIG. 3, the result displaying unit 107 displays a strain check direction designating screen for receiving from the user, the setting of a reference direction (hereinafter called a component strain check direction) on the mounting surface to check whether or not there is strain in the component (s211).

(Strain Check Direction Designating Screen)

Figure 11:
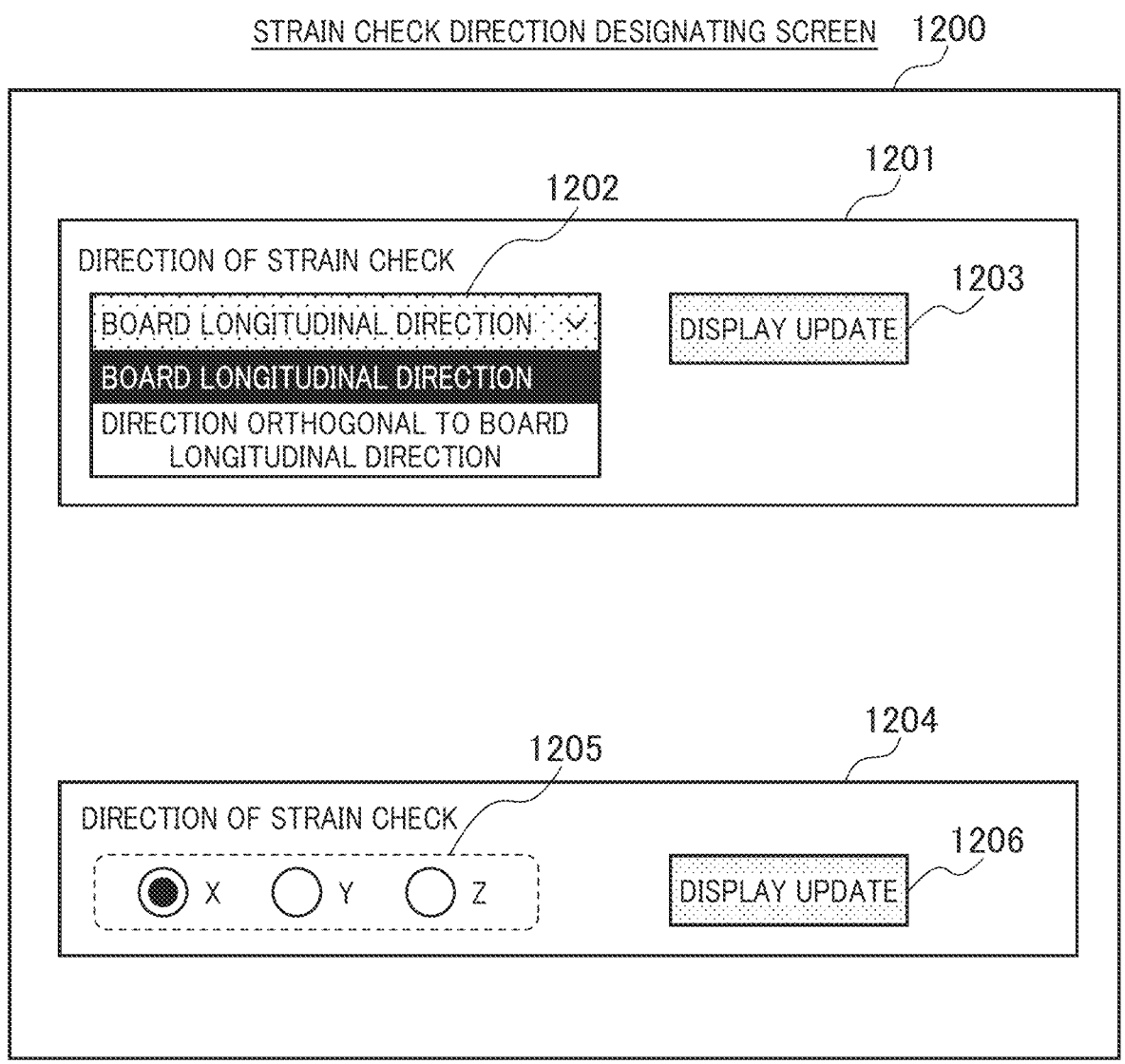
FIG. 11 is a view showing an example of a strain check direction designating screen.

FIG. 11 is a view showing an example of a strain check direction designating screen 1200. The strain check direction designating screen 1200 has a first direction check column 1201 including a first direction selecting column 1202 to select whether the component strain check direction should be the longitudinal direction on the mounting surface of the objective board or the direction orthogonal to the longitudinal direction, and a display update column 1203 to display a result display screen 1300 to be described later, based on the component strain check direction selected by the first direction selecting column 1202.

Further, the strain check direction designating screen 1200 includes instead of the first direction check column 1201, a second direction check column 1204 for designating a component strain direction.

The second direction check column 1204 includes a second direction selecting column 1205 to select whether the component strain check direction should be set to either the x direction, the y direction or the z direction, and a display update column 1206 to display a result display screen 1300 to be described later, based on the component strain check direction selected by the second direction selecting column 1205.

Basically, the user designates the component strain check direction by using the first direction check column 1201, but it may be difficult for the user to known the longitudinal direction depending on the shape or size of the objective board (for example, where the objective board is square in shape). In such a case, the user is capable of designating the component strain check direction by using the second direction selecting column 1205.

Subsequently, as shown in FIG. 3, the result displaying unit 107 specifies a component (hereinafter called a strain component) whose longitudinal direction is almost the same as the component strain direction designated in s211, of components mounted (or to be mounted) in the strain region specified in s210, and displays a result display screen to display the specified strain component in superposition on the strain region displayed in s211 (s210).

Here, the result displaying unit 107 is capable of simply specifying a strain component as follows, for example. That is, the result displaying unit 107 recognizes the shape of each component as a rectangular parallelepiped containing at least the entire component. As for each of these rectangular parallelepipeds, the result displaying unit 107 specifies a triangular mesh whose strain is greater than or equal to a strain threshold value, of a set of triangular meshes in the rectangular parallelepiped, and selects the rectangular parallelepiped whose distance to the specified triangular mesh is less than or equal to a predetermined distance (for example, 0.1 mm). When the longitudinal direction of the selected rectangular parallelepiped is almost the same as the current strain check direction, the result displaying unit 107 can specify a component contained in the rectangular parallelepiped as a strain component.

Since the shape of each component may be different, the processing of strictly specifying a component whose strain is larger than the strain threshold value becomes often complicated, and also depends on the format of the CAD data. Therefore, such a simple method using the rectangular parallelepiped approximation is adopted, thereby making it possible to specify each component large in strain easily and rationally.

Here, description will be made as to a specific example of the result display screen.

(Result Display Screen)

Figure 12:
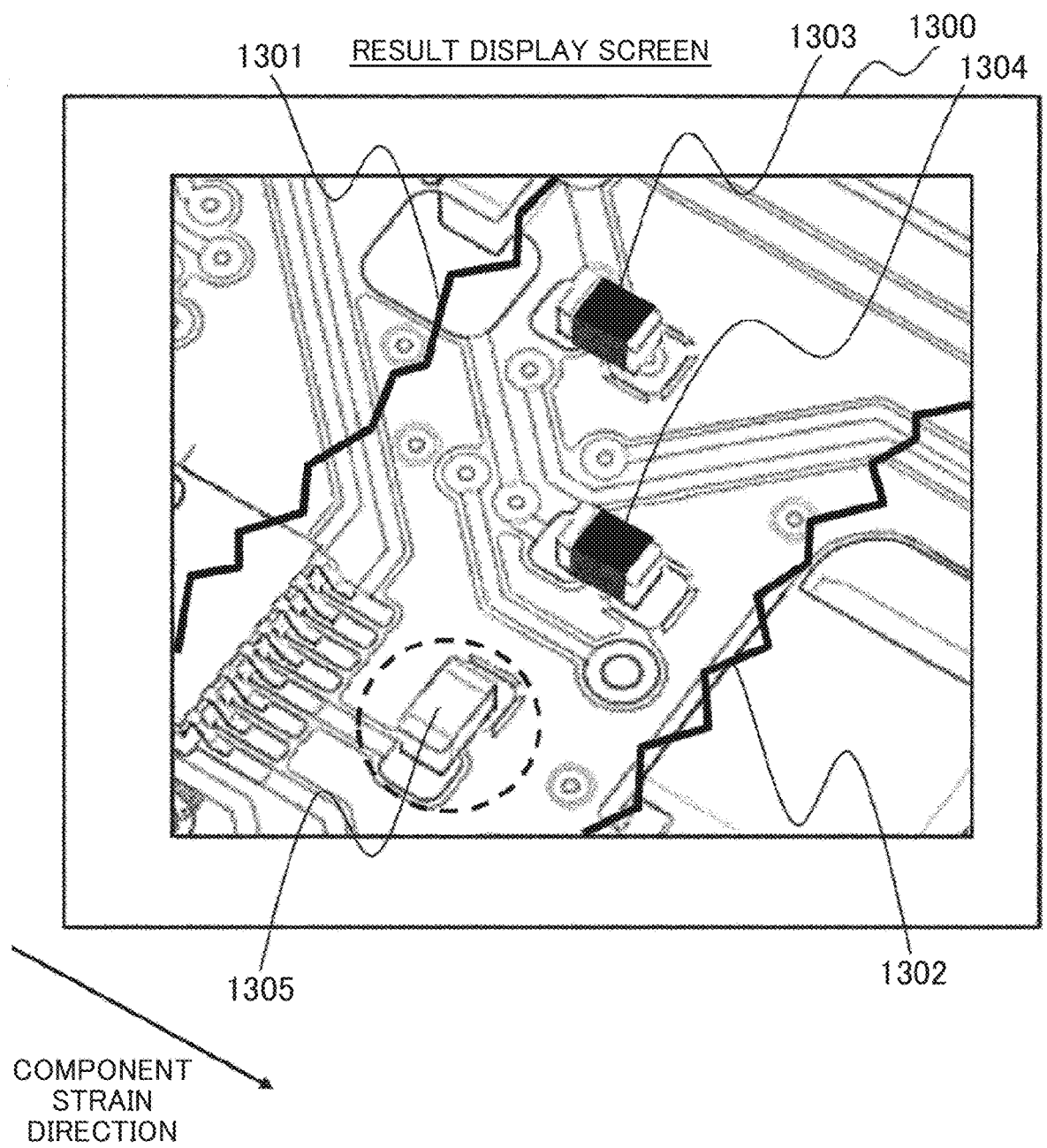
FIG. 12 is a view showing an example of a result display screen.

FIG. 12 is a view showing an example of the result display screen 1300. Boundary lines 1301 and 1302 (contour lines) between strain regions, and multilayer ceramic capacitors 1303, 1304, and 1305 existent inside the strain region are displayed on the result display screen 1300.

The portions of dielectrics of the multilayer ceramic capacitors 1303 and 1304 whose longitudinal directions are almost the same as the strain check direction, among these are given emphasis display such as highlights, and the portion of a dielectric of the other multilayer ceramic capacitor 1305 whose longitudinal direction is the direction approximately orthogonal (for example, within the range of a predetermined angle from the direction orthogonal to the strain check direction) is not highlighted.

Incidentally, in the result display screen 1300, the portion (ceramic-made) of the dielectric of each multilayer ceramic capacitor is given emphasis display, but the portion to be highlighted is not limited to this. Since the multilayer ceramic capacitor is constituted of a plurality of parts like an external electrode, an internal electrode, a dielectric, the entire multilayer ceramic capacitor corresponding to an assembly model comprised of these parts may be given emphasis display.

Incidentally, when the portion of the dielectric of the multilayer ceramic capacitor is highlighted, portions different from electric components, such as a lead wire, etc. may also be highlighted. In order to prevent these portions from being highlighted, for example, component names are set to respective parts of three-dimensional CAD data, and portions to be highlighted can be limited based on the component names.

Next, the detail of the board analysis processing will be described.

<Board Analysis Processing>

Figure 13:
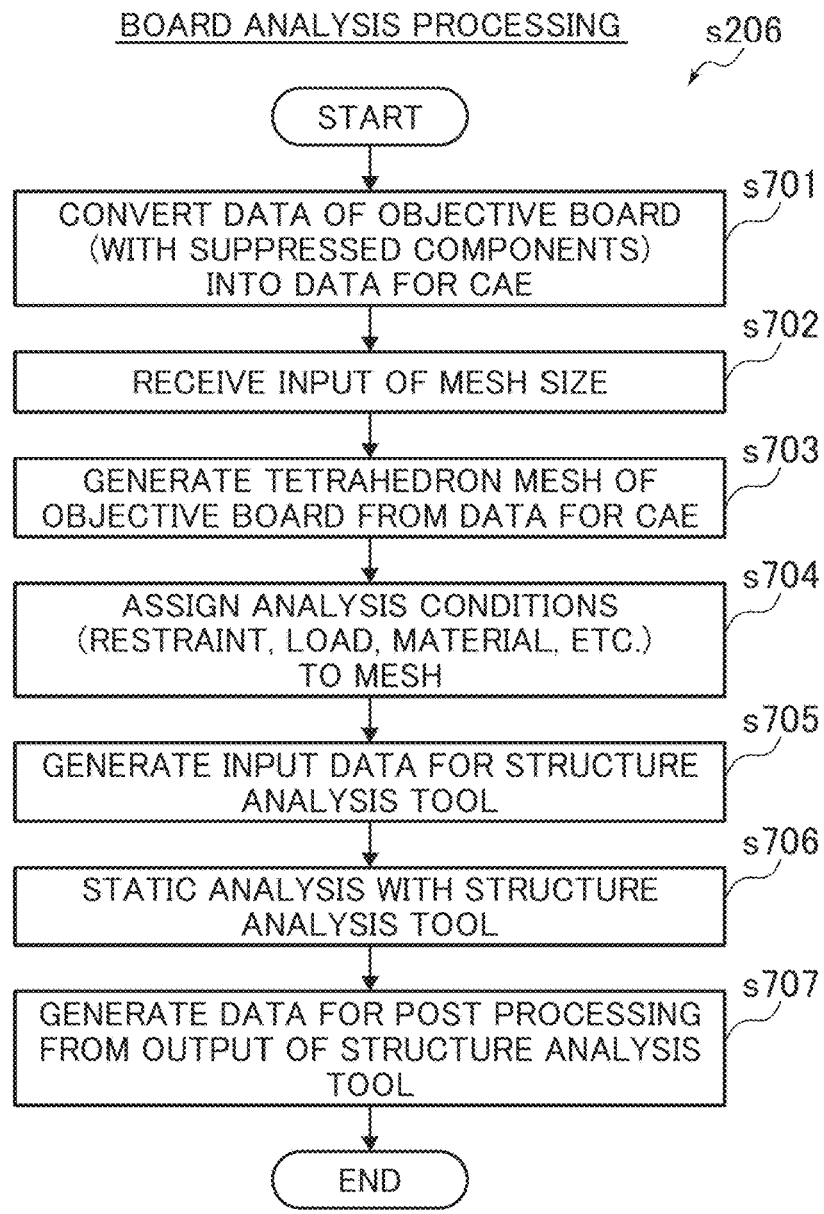
FIG. 13 is a flowchart describing an example of board analysis processing.

FIG. 13 is a flowchart describing an example of the board analysis processing. The board analyzing unit 104 converts data of a printed circuit board (blank board) of objective boards in which components are suppressed, into shape data in a predetermined format (data for CAE) (s701).

Further, the board analyzing unit 104 displays a mesh size input screen which receives from the user, the designation of the size of a tetrahedron mesh used for a structure analysis program (s702).

(Mesh Size Input Screen)

Figure 14:
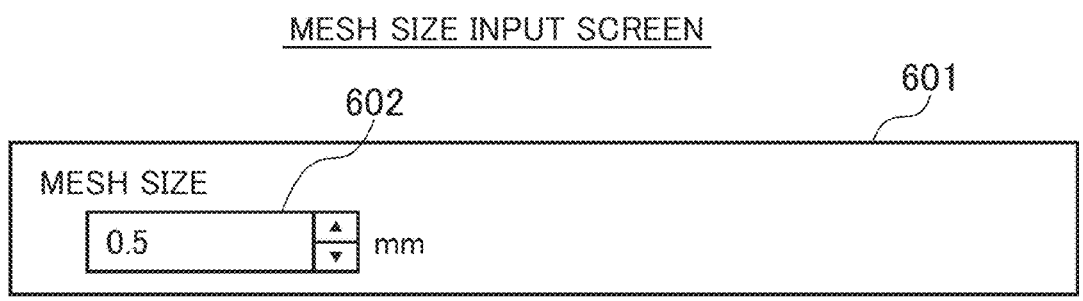
FIG. 14 is an example of a mesh size input screen.

FIG. 14 is an example of the mesh size input screen 601. The mesh size input screen 601 includes a mesh size designating column 602 which receives the designation of the size of the tetrahedron mesh as the reference. In the example of the same drawing, in view of the thickness of a general printed circuit board, the number of meshes, and analysis accuracy, 0.5 mm is set as a default value of the size of the mesh.

Next, as shown in FIG. 13, the board analyzing unit 104 creates tetrahedron mesh data indicative of the structure of an objective board (blank board) that has suppressed components on the board surface on the basis of the data for CAE converted in s701, and the portions to be analyzed (mounting surface and back surface) designated in s203 (s703).

Further, the board analyzing unit 104 sets the analysis conditions input in s204 to the corresponding tetrahedron mesh of the tetrahedron meshes created in s703 (s704).

The board analyzing unit 104 converts the tetrahedron mesh data created in s704 to which the analysis conditions are set, into input data in the format corresponding to the structure analysis program (s705).

The board analyzing unit 104 executes the structure analysis (static analysis) of the blank board by inputting the input data created in s705 to the structure analysis program (s706).

For example, the structure analysis program outputs data of the tetrahedron mesh indicative of the structure of the blank board after application of strain based on the analysis condition.

Thereafter, the board analyzing unit 104 creates post processing data, based on the data output by execution of s705 (s706). This completes the analysis processing.

As described above, the board analysis supporting system of the present embodiment sets the mounting surface for mounting the components on the predetermined board (printed circuit board), calculates the strain generated in the blank board on the basis of the three-dimensional structure data indicative of the blank board from which the components are removed, and the data (analysis condition) indicative of the predetermined deformation force, and calculates the calculated strain as the strain of each component mounted on the mounting surface.

Thus, since the strain of the blank board due to the deformation force at the mounting surface is calculated as the strain of each component mounted on the mounting surface, it is possible to accurately predict the strain generated in the component on the mounting surface.

The strain generated in each component on the board can be predicted by simple numerical calculation without preparing detailed three-dimensional data such as three-dimensional data of soldering portions to the printed circuit board, and three-dimensional data indicative of the contact state between each component and the printed circuit board, for example.

Thus, according to the board analysis supporting system 1 of the present embodiment, it is possible to quickly and accurately calculate the strain generated in each component mounted onto the board.

It is possible to easily perform, for example, the evaluation of risk of damage to various components mounted on a printed circuit board, design support for electrical products each manufactured using a printed circuit board, and reliability evaluation of electrical products.

Further, the board analysis supporting system 1 of the present embodiment can be widely applied to a printed circuit board mounted with components having various sizes or shapes by using strain being a dimensionless unit.

Second Embodiment

Next, a board analysis supporting system according to a second embodiment will be described.

<System Configuration and Function>

Figure 15:
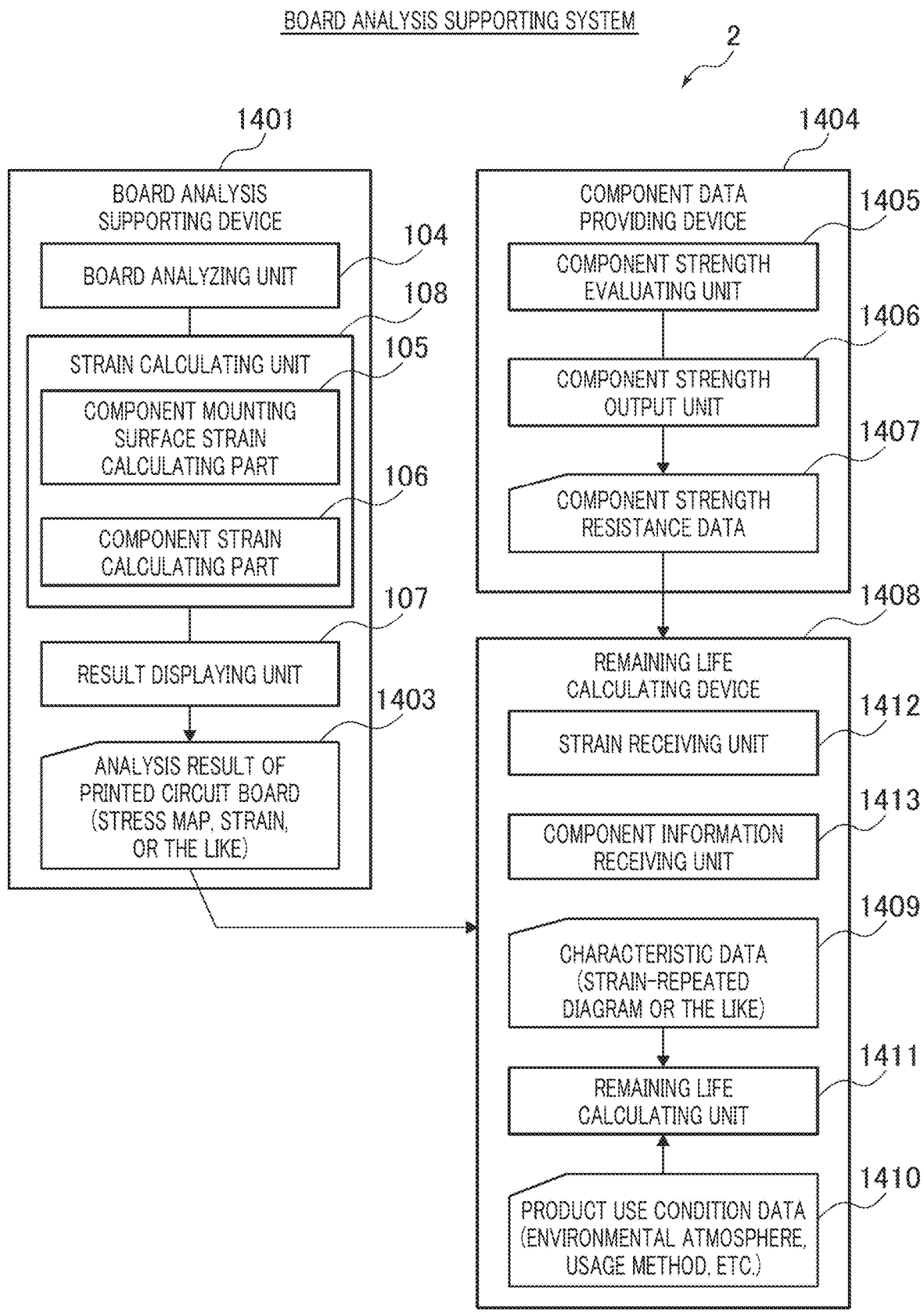
FIG. 15 is a view describing an example of a configuration of a board analysis supporting system according to a second embodiment.

FIG. 15 is a view describing an example of a configuration of the board analysis supporting system 2 according to the second embodiment. The present board analysis supporting system 2 is applied to, for example, such a supply chain that a manufacturer for manufacturing a final product (electrical product or the like) by assembling a printed circuit board manufactured by a board maker and components procured from a component maker while incorporating own products supplies the final product to the market. In the supply chain, the manufacturer calculates the remaining life as a reliability evaluation of a final product while considering a condition of use for the final product, etc.

That is, the board analysis supporting system 2 of the present embodiment is constituted by including a user terminal 101 and a database 102 (both not shown) similar to those in the first embodiment, a board analysis supporting device 1401 managed by a board maker, a component data providing device 1404 managed by a component maker, and a remaining life calculating device 1408 managed by a manufacturer. These devices are communicably connected to each other by a network 5 similar to that in the first embodiment.

The board analysis supporting device 1401 has a hardware configuration and functions similar to those in the first embodiment.

Further, a result displaying unit 107 of the board analysis supporting device 1401 transmits a printed circuit board analysis result 1403 being information including component strain (for example, a stress map showing the relationship between a deformation force and strain) to the remaining life calculating device 1408.

Next, the component data providing device 1404 includes a hardware configuration similar to that of the board analysis supporting device 103 in the first embodiment.

The component data providing device 1404 includes a component strength evaluating unit 1405 which calculates or stores the strength (resistance against strain) of each component mountable on the printed circuit board as the final product, and a component strength output unit 1406 which transmits component strength resistance data 1407 being information about the strength of each component calculated by the component strength evaluating unit 1405 or stored therein to the remaining life calculating device 1408.

The component strength evaluating unit 1405 calculates or stores the strength of each component, based on results of various experiments on components, and an execution result of a predetermined simulation.

The component strength resistance data 1407 includes information about the maximum number of repetitions (the upper limit of the number of times strain can be applied without damaging each component where the strain is repeatedly generated in the component) being information provided by the component maker.

Next, the remaining life calculating device 1408 includes a hardware configuration similar to that of the board analysis supporting device 103 of the first embodiment.

The remaining life calculating device 1408 stores characteristic data 1409 being data of the characteristic of each component used in the printed circuit board as the final product. The characteristic data 1409 is, for example, an ε-N diagram (strain-repeated diagram), an S-N diagram (stress-repeated diagram) or the like of each component.

Further, the remaining life calculating device 1408 stores product use condition data 1410 being data indicative of the state of use of the final product. The product use condition data 1410 is information about the use condition of the final product, for example, information (e.g., a cycle of a temperature change during the operation of the final product) about the environment (atmosphere) in which the final product exists, and its usage method.

Next, the remaining life calculating device 1408 includes a strain receiving unit 1412, a component information receiving unit 1413, and a remaining life calculating unit 1411.

The strain receiving unit 1412 receives strain (printed circuit board analysis result 1403) of each component calculated by the board analysis supporting device 1401 from the board analysis supporting device 1401.

The component information receiving unit 1413 receives information (component strength resistance data 1407) indicative of the characteristic of the component from the component data providing device 1404.

The remaining life calculating unit 1411 calculates the relationship between strain of the component and fatigue of the board, based on the strain received by the strain receiving unit 1412, and the information about the characteristic of the component, which is received by the component information receiving unit 1413, and calculates the remaining life of the final product, i.e., the component, based on the calculated relationship.

<Processing>

Subsequently, description will be made as to processing (remaining life calculating processing) performed in the board analysis supporting system 2 of the present embodiment.

Figure 16:
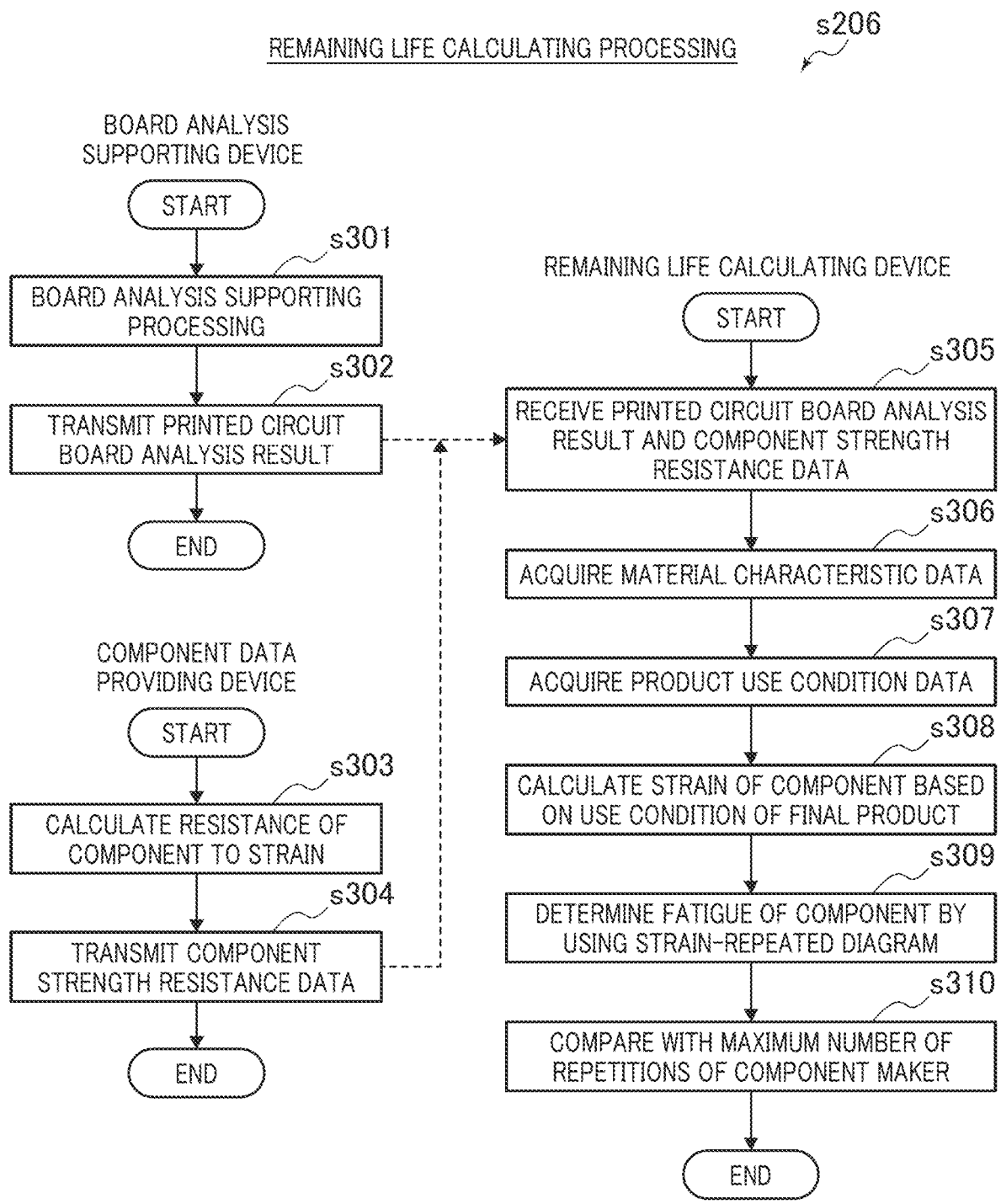
FIG. 16 is a flowchart describing an example of remaining life calculating processing.

FIG. 16 is a flowchart describing an example of the remaining life calculating processing.

First, the board analysis supporting device 1401 executes board analysis supporting processing similar to the first embodiment (s301) and transmits a printed circuit board analysis result 1403 being information indicating the result of its execution to the remaining life calculating device 1408 (s302).

On the other hand, the component data providing device 1404 calculates or acquires the strength of each component manufactured by the component maker (s303) and transmits component strength resistance data 1407 being information about the calculated or acquired strength of each component to the remaining life calculating device 1408 (s304).

The strain receiving unit 1412 receives the printed circuit board analysis result 1403, and the component information receiving unit 1413 receives the component strength resistance data 1407 (s305).

The remaining life calculating unit 1411 acquires material characteristic data 1409 (s306). Further, the remaining life calculating unit 1411 acquires product use condition data 1410 (s307).

The remaining life calculating unit 1411 calculates based on the printed board analysis result 1403 received in s305 and the product use condition data 1410 acquired in s307, strain generated in each component provided on a printed circuit board as a final product due to events repeated under the use condition of the final product (the occurrence of such a deformation force as to generate strain in each component, etc. For example, the transportation, operation or maintenance of the printed circuit board. Hereinafter simply called events) (s308).

The remaining life calculating unit 1411 applies the strain calculated in s308 and the number of events to the information (strain-repeated diagram) of the material characteristic data 1409 acquired in s306 to determine whether each component is damaged due to its fatigue or determine how many event repetitions the component can withstand, etc., thereby estimating the remaining life of the component (s309).

Further, the remaining life calculating unit 1411 compares the result of determination in s309 and the component strength resistance data 1407 to thereby determine whether the maximum number of repetitions provided by the component maker is applied even to the final product, and displays the result of its determination (s310).

Incidentally, the remaining life calculating unit 1411 may obtain the degree of cumulative damage of the printed circuit board by using the modified minor's rule and compare the obtained cumulative damage degree with the upper limit value (component strength resistance data 1407) of the strain acquired from the component data providing device 1404 to thereby output the safety factor of the final product.
(Strain-Repeated Diagram)

Figure 17:
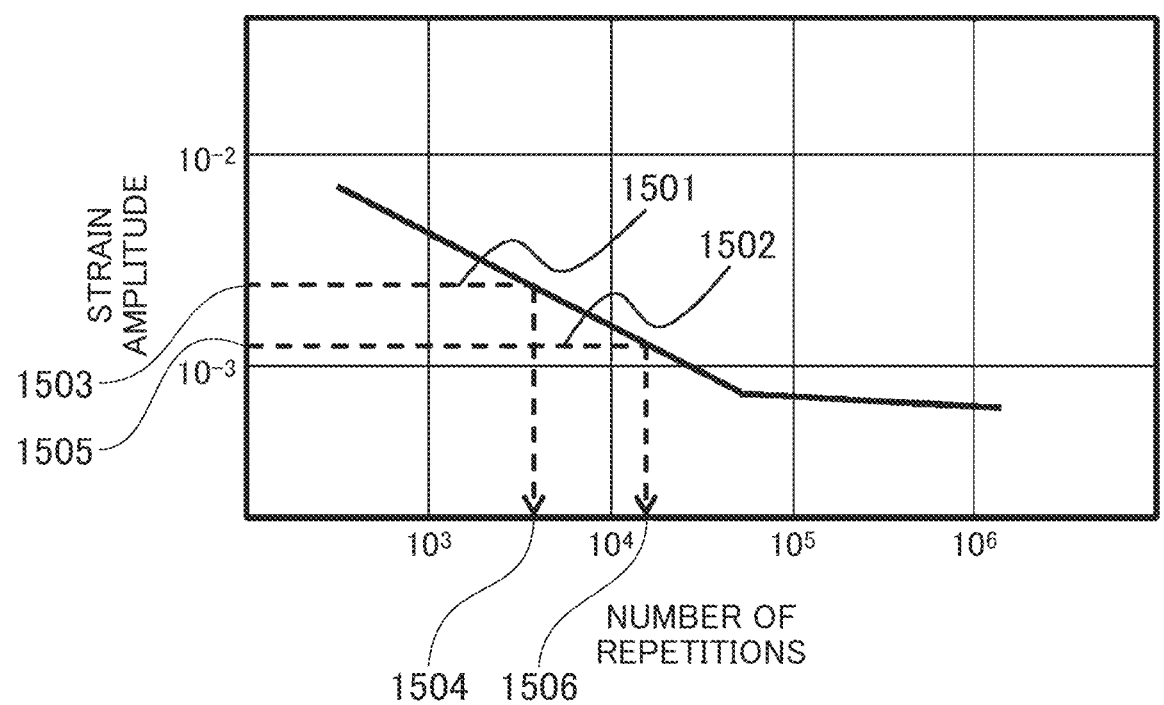
FIG. 17 is an example of a strain-repeated diagram showing a correlation between the amplitude of strain and fatigue.

FIG. 17 is an example of a strain-repeated diagram 1500 showing the correlation between the amplitude of strain and fatigue. The strain-repeated diagram 1500 is a diagram in which one axis is taken as the axis of strain amplitude indicative of strain applied to the component, and the other axis is taken as the axis of the number of times the strain is applied (number of repetitions) that damages the component where the strain amplitude is given.

In the example of the same drawing, a certain component is capable of withstanding a strain of the number of repetitions 1504 with respect to a strain amplitude 1503 corresponding to the calculated strain (reference numeral 1501). Further, the other component is capable of withstanding a strain of the number of repetitions 1506 with respect to a strain amplitude 1505 corresponding to the calculated strain (reference numeral 1502). By comparing these two numbers of repetitions 1504 and 1506 with the maximum number of repetitions provided by the component maker, the actual performance of each component and the performance provided by the component maker can be compared.

Although the embodiments for carrying out the present invention have been specifically described above, the present invention is not limited thereto, but can be changed in various ways within the scope not departing from the spirit of the present invention.

For example, in the present embodiment, it is assumed that the mounting surface of the printed circuit board is one side. However, when both surfaces of the printed circuit board are mounting surfaces, for example, first, board analysis supporting processing is performed in which one surface is taken as the mounting surface, and the other surface is taken as the back surface, and thereafter, board analysis supporting processing may be performed in which the other surface is taken as the mounting surface, and the one surface is taken as the back surface.

Further, in the present embodiment, the direction of arrangement of the components mounted on the printed circuit board is assumed to be the longitudinal direction of the printed circuit board or its orthogonal direction, but it can be applied even where components exist in other directions. For example, when the longitudinal direction of the component is within the range of a predetermined angle from the longitudinal direction of the printed circuit board, it can be determined that the component is in the strain direction.

The description of the present specification described above reveals at least the following. That is, in the board analysis supporting system of the present embodiment, the information processing device may calculate as the strain of the component, the difference between the distance between the predetermined substance points on the set surface before the application of the predetermined force, and the distance between the predetermined substance points on the set surface after the application of the predetermined force in the strain calculating processing.

Thus, by calculating as the strain, the difference between the distance (distance between the nodes) between the predetermined substance points on the mounting surface before application of such a force (deformation force) as to give the strain, and the distance between the nodes on the mounting surface after application of the force (deformation force), it is possible to accurately calculate the strain on the deformed mounting surface.

Further, in the board analysis supporting method of the present embodiment, when it is determined that the calculated strain of component exceeds the predetermined threshold value, the information processing device may execute the result display processing of specifying the component mounted in the position corresponding to each of the substance points on the set surface, and outputting the warning information related to the specified component.

Thus, when the calculated strain exceeds the predetermined threshold value, the warning information related to each of the components mounted in the positions corresponding to the above nodes on the mounting surface is output, thereby making it possible to make the user aware of the component that is likely to be damaged by strain, and perform reliability evaluation about the printed circuit board and the component.

Further, in the board analysis supporting method of the present embodiment, when in the result display processing, the information processing device sets the predetermined direction on the mounting surface of the components and determines that the predetermined direction constituent in the calculated strain of the component exceeds the predetermined threshold value, the information processing device may output the warning information about the component.

Thus, the warning information is output where the predetermined direction on the mounting surface is set, and the direction constituent in the calculated strain is determined to have exceeded the predetermined threshold value, so that the user can find the strain accurately by setting the deformation direction in which strain is likely to occur, for example.

Further, in the board analysis supporting method of the present embodiment, when in the result display processing, the information processing device sets the longitudinal direction on the surface mounting each component, and determines that the constituent in the longitudinal direction in the calculated strain of the component has exceeded the predetermined threshold value, the information processing device may output the warning information about the component.

By setting the longitudinal direction of the board surface as the deformation direction prone to the strain in this manner, the user is capable of finding the strain with satisfactory accuracy. Further, since the direction orthogonal to the longitudinal direction of the board surface or the like is less likely to lead to damage to the components even if the strain occurs, an unnecessary warning display can be suppressed in this case if the warning information is prevented from being displayed.

Further, the board analysis supporting system of the present embodiment may include the remaining life calculating device which executes strain receiving processing of receiving the strain of the component calculated by the board analysis supporting device from the board analysis supporting device, component information receiving processing of receiving the information indicative of the characteristic of the component from a predetermined information processing device, and remaining life calculating processing of calculating the relationship between the strain of the component and the fatigue of the board, based on the received strain and the received information of the component characteristic, and calculating the remaining life of the board, based on the calculated relationship.

Thus, the remaining life calculating device calculates the remaining life of the board from the relationship between the strain of the component and the fatigue of the board, based on the strain of the component received from the board analysis supporting device and the information of the component characteristic received from the component data providing device 1404. Consequently, for example, a user that manufactures a product using a board and components is capable of verifying the reliability of each component in the product. Further, through this, the user is capable of requesting the board designer to change the arrangement of the components or urging the component maker to change to strain-resistant components. Further, consequently, the failure of a product can be prevented in advance, thus leading even to the reduction of wastes.

LIST OF REFERENCE SIGNS

1 . . . board analysis supporting system,
101 . . . user terminal,
103 . . . board analysis supporting device.

The invention claimed is:
1. A board analysis supporting method comprising the following to be executed by an information processing device:
  board analyzing processing of setting a surface on which a component is mounted on a predetermined board, and calculating strain generated in the board from which the component has been removed, based on three-dimensional structure data indicating the board from which the component has been removed, and data indicating a predetermined force;
  strain calculating processing of calculating the calculated strain on the set surface as strain of the component mounted on the set surface;

strain receiving processing of receiving the strain of the component calculated during the strain calculating processing, wherein the strain of the component comprises a stress map of a relationship between a deformation force and the strain;

component information receiving processing of receiving information indicative of a characteristic of the component from the information processing device, the information indicative of the characteristic comprising component strength resistance data; and remaining life calculating processing of calculating a relationship between the strain of the component and fatigue of the board, based on the received strain and the received information of the characteristic of the component, and calculating a remaining life of the board, based on the calculated relationship corresponding to events repeated under use conditions of the component provided on a printed circuit board as a final product.

2. The board analysis supporting method according to claim 1, wherein in the strain calculating processing, the information processing device calculates as the strain of the component, a difference between a distance between predetermined substance points on the set surface before application of the predetermined force, and a distance between the predetermined substance points on the set surface after application of the predetermined force.

3. The board analysis supporting method according to claim 1, wherein when it is determined that the calculated strain of the component exceeds a predetermined threshold value, the information processing device executes result displaying processing of specifying a component mounted in a position corresponding to a substance point on the set surface and outputting warning information related to the specified component.

4. The board analysis supporting method according to claim 3, wherein in the result displaying processing, the information processing device sets a predetermined direction on the surface on which the component is mounted, and outputs the warning information related to the component when it is determined that a constituent in the predetermined direction in the calculated strain of the component exceeds a predetermined threshold value.

5. The board analysis supporting method according to claim 4, wherein in the result displaying processing, the information processing device sets a longitudinal direction on the surface on which the component is mounted, and outputs the warning information related to the component when it is determined that a constituent in the longitudinal direction in the calculated strain of the component exceeds a predetermined threshold value.

6. A board analysis supporting system comprising: a board analysis supporting device which includes a processor and a memory, and executes:

board analyzing processing of setting a surface on which a component is mounted on a predetermined board, and calculating strain generated in the board from which the component has been removed, based on three-dimensional structure data indicating the board from which the component has been removed, and data indicating a predetermined force, strain calculating processing of calculating the calculated strain on the set surface as strain of the component mounted on the set surface;

strain receiving processing of receiving the strain of the component calculated during the strain calculating processing, wherein the strain of the component comprises a stress map of a relationship between a deformation force and the strain;

component information receiving processing of receiving information indicative of a characteristic of the component from the information processing device, the information indicative of the characteristic comprising component strength resistance data; and remaining life calculating processing of calculating a relationship between the strain of the component and fatigue of the board, based on the received strain and the received information of the characteristic of the component, and calculating a remaining life of the board, based on the calculated relationship corresponding to events repeated under use conditions of the component provided on a printed circuit board as a final product.

* * * * *